United States Patent
Reed

[15] 3,650,171
[45] Mar. 21, 1972

[54] ROTARY CUTTING DEVICE

[72] Inventor: Gaylard O. Reed, Portland, Oreg.
[73] Assignee: Salem Equipment, Inc., Salem, Oreg.
[22] Filed: Dec. 3, 1969
[21] Appl. No.: 881,644

[52] U.S. Cl............................83/355, 83/341, 83/349, 83/673
[51] Int. Cl...........................................B26d 1/20
[58] Field of Search................83/341, 342, 349, 355, 673, 83/674; 241/239, 241

[56] References Cited

UNITED STATES PATENTS

| | | | |
|---|---|---|---|
| 3,073,196 | 1/1963 | Marcalus | 83/341 |
| 2,399,529 | 4/1946 | Willits | 83/341 |
| 2,682,996 | 7/1954 | Forman | 83/349 X |
| 3,000,250 | 9/1961 | Altmann et al. | 83/673 X |

*Primary Examiner*—William S. Lawson
*Attorney*—Oliver D. Olson

[57] ABSTRACT

A rotary head mounts a straight cutter blade the working edge of which intercepts the plane of an associated flat anvil to form an acute included angle. The anvil is provided with a longitudinally concave working edge which is contiguous to the working edge of the blade uniformly throughout their cooperative lengths, and preferably with a longitudinally concave and transversely sinusoidal working face, the opposite longitudinal edges of which are reverse images of each other, whereby the anvil is reversible. This anvil construction is provided by traversing the working face with a rotary cutting tool which defines a cutting arc having the same radius as the rotational radius of the blade, with the intercepting planes of the anvil and direction of relative movement of the anvil and cutting tool being arranged to form the aforementioned acute included angle.

2 Claims, 9 Drawing Figures

PATENTED MAR 21 1972 3,650,171

Gaylard O. Reed
INVENTOR
BY
Agent

3,650,171

ROTARY CUTTING DEVICE

BACKGROUND OF THE INVENTION

This invention relates to cutting devices, and more particularly to a novel rotary cutting device and to the method and apparatus for making it.

In the cutting of wood, metal and other materials by a rotary cutting device, it is desirable that the cutter blade traverse the working edge of an associated anvil at a shearing angle, to minimize the power requirements of the device and to produce a sharply defined cut. Rotary cutting devices available heretofore have provided such shearing action only by utilizing structural arrangements which are expensive to produce, maintain and replace, or which are not sufficiently precise for certain types of uses.

For example, some types of prior cutting devices employ specially contoured and therefore expensive cutting blades which require special and therefore costly apparatus to produce and maintain them. Other types employ rotary heads specially designed and mounted to support straight blades at acute angles to the rotational axis of the head and to the anvil. Such head constructions are expensive to produce. Still other types of cutting devices utilize anvils made in straight sections and mounted in angular relationship to approximate a curved anvil, whereby to accommodate the use of straight blades on a cylindrical rotary head. Such sectional anvils are usable only when their angular dispositions are extremely small, i.e., allowing blade clearance of not more than one or two thousands of an inch. Even so, such variations in clearance result in imperfect cutting and therefore such cutting devices cannot be used for precision work.

SUMMARY OF THE INVENTION

In its basic concept, the present invention provides a rotary cutting device in which a straight cutter blade mounted on a rotary head cooperates with an anvil disposed at an acute angle to the blade and provided with a working edge which is contiguous to the rotating blade uniformly throughout their cooperative lengths. This invention also provides a method and apparatus for forming the working edge of the anvil.

It is by virtue of the foregoing basic concept that the principal object of this invention is achieved, namely to overcome the aforementioned disadvantages associated with prior rotary cutting devices.

Another important object of this invention is the provision of a rotary cutting device of the class described, and method and apparatus for producing the anvil thereof.

A further object of this invention is the provision of a rotary cutting device having a reversible anvil provided with a pair of working edges, and the provision of method and apparatus for producing said anvil.

The foregoing and other objects and advantages of this invention will appear from the following detailed description, taken in connection with the accompanying drawing of the preferred embodiments.

DESCRIPTION OF THE PREFERRED EMBODIMENTS

Figures 1, 9:
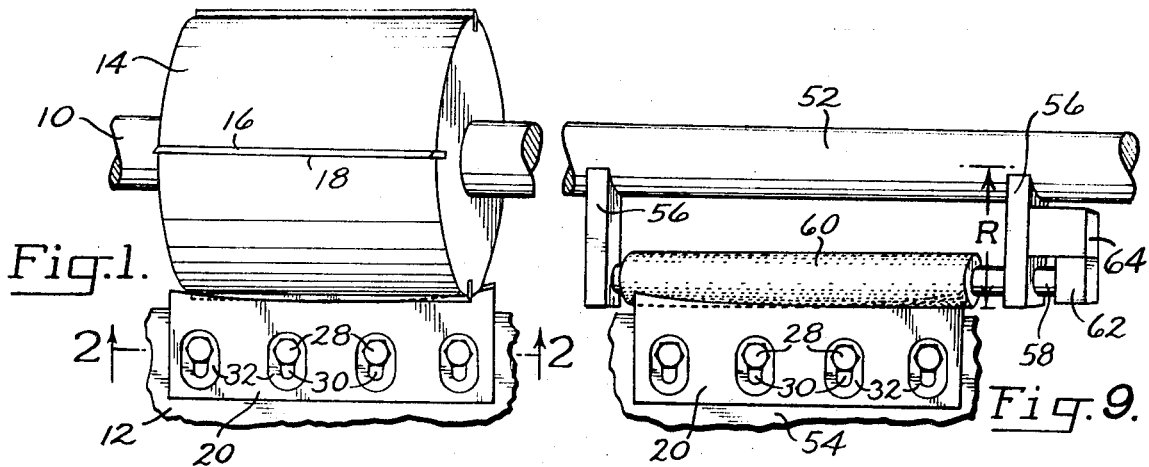
FIG. 1 is a fragmentary perspective view of a rotary cutting device embodying the features of this invention.
FIG. 9 is a fragmentary plan view of another form of apparatus for producing the working face of the anvil component.
Figures 2, 3:
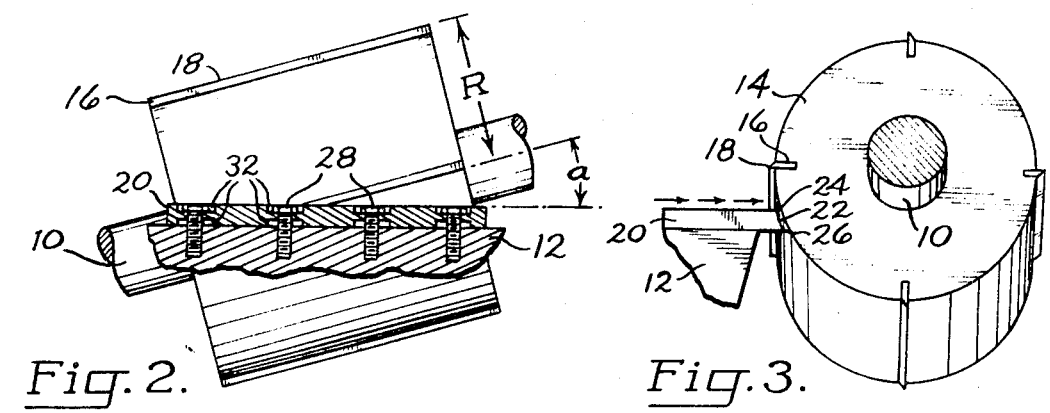
FIG. 2 is a fragmentary sectional view taken on the line 2—2 in FIG. 1.
FIG. 3 is a fragmentary end elevation as viewed from the right in FIG. 2.

Referring first to FIGS. 1-3 of the drawing, the rotary cutting device illustrated therein includes a rotary shaft 10 which, as will be understood, is supported by an associated portion of frame 12 and driven by a suitable source of power (not shown) such as an electric motor. The shaft mounts a blade supporting head 14 for rotation therewith. In the embodiment illustrated, the head is of cylindrical shape and mounts a plurality of circumferentially spaced cutter blades 16.

An advantage of the present invention resides in the fact that each of the blades may be of conventional, inexpensive flat construction providing a straight cutting edge 18. Blades of this type are capable of being sharpened with speed and facility and with conventional and inexpensive sharpening equipment. They also may be replaced at minimum cost.

As explained hereinbefore, it is desirable that the working edge 18 of cutter blade 16 traverse an associated anvil 20 at a shearing angle, such as angle $a$ illustrated in FIG. 2. The present invention affords such an arrangement with an anvil that preferably is of flat, one-piece construction and provided with a working edge which is contoured so as to be contiguous to the rotating straight edge blade uniformly throughout its length. Moreover, in the preferred embodiment illustrated the anvil is provided with a working face 22 which is longitudinally arcuate and transversely sinusoidal, defining a pair of parallel longitudinal working edges 24 and 26 which are reverse images of each other. By this means the anvil is reversible, to present a new working edge when the other has become worn.

Thus, in the embodiment illustrated, the anvil is formed from a flat plate of uniform thickness supported on an associated portion of frame 12 for adjustment of the working edge toward and away from the rotating cutter blade. Although such an adjustable mounting may be provided in various ways, it is provided in the embodiment illustrated by a plurality of bolts 28 which extend through transversely elongated slots 30 in the anvil and are secured in threaded openings in the frame. Recessed pockets 32 in the anvil surrounding the slots are provided in the opposite faces of the anvil, to recess the bolt heads below the work supporting surface of the anvil in each of its reversible positions.

In the embodiment illustrated, rotation of the cutter blades describes a cylinder of uniform diameter. The working face 22 of the reversible anvil thus is contoured to a longitudinally concave and transversely sinusoidal shape so that it is contiguous to the described cylinder uniformly throughout its length and width.

The method by which to produce the above described working face of the anvil involves the provision of a rotary cutting tool, the rotation of the cutting surface of which describes an arc having the same radius as the radius R (FIG. 2) of rotation of the cutter blade. The cutting tool and anvil then are disposed at the same acute angle $a$ as the anvil and cutter blade are disposed at during normal operation of the rotary cutting device. The cutting tool and anvil then are moved relative one to the other to traverse the working face of the anvil with the cutting tool, substantially at said acute angle.

Figures 4, 8:
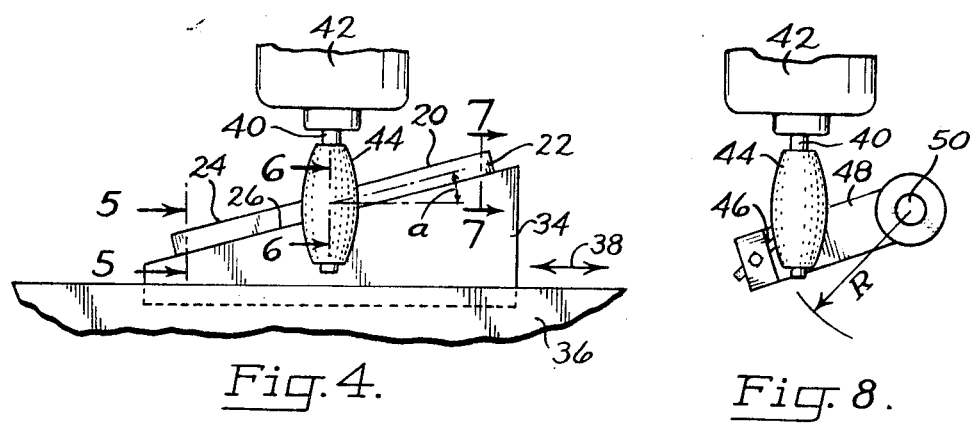
FIG. 4 is a fragmentary plan view of apparatus for forming the working face of the anvil component of the rotary cutting device illustrated in the preceding views.
FIG. 8 is a fragmentary plan view of apparatus for contouring the cutting tool illustrated in FIG. 4.
Figures 5, 6, 7:
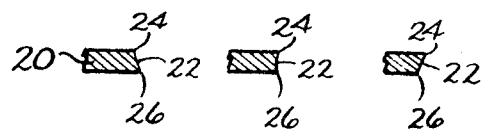
FIGS. 5, 6 and 7 are fragmentary sectional views taken on the lines 5—5, 6—6 and 7—7, respectively, in FIG. 4, showing the contour of the working face of the anvil at the indicated longitudinally spaced positions along the length of the anvil.

One form of apparatus providing the aforementioned method is illustrated in FIG. 4. The anvil 20 is secured removably to a block 34 which, in turn, is mounted on a frame 36 for longitudinal reciprocation relative thereto, in the direction of the arrow 38. The output rotary shaft 40 of a drive motor 42 mounts a cutting tool 44 for rotation on an axis which is substantially perpendicular to the direction 38 of longitudinal reciprocation of the block. The cutting tool illustrated is a grinding wheel, although it may be a milling head or other suitable form of tool. The longitudinal surface of the cutting tool is arcuate, having the same radius as the radius R of rotation of the cutter blade.

When the cutting tool 44 is provided in the illustrated form of a grinding wheel, the arcuate surface of said radius R may be provided in the manner illustrated in FIG. 8. Thus, a dressing tool 46 is mounted on the end of an arm 48 supported at its opposite end for pivotal movement about the pivot shaft 50. The pivot shaft is positioned perpendicular to the axis of rotation of the grinding wheel at the longitudinal center thereof, and the working surface of the dressing tool is spaced from the rotational axis of the shaft 50 by the same distance as the radius R. Thus, as the arm is oscillated about its pivot shaft, the working surface of the dressing tool describes the arc of radius R and thus dresses the grinding wheel to the same radius of curvature.

Referring again to FIG. 4 of the drawing, the cutting tool 44 is positioned relative to the working face 22 of the anvil 20 such that when a line through its transverse center is positioned at the center of the working face and perpendicular thereto, said line defines the apex of the acute angle $a$ defined between a line extending parallel to the working face and a line extending parallel to the direction 38 of reciprocation of the block. The working face produced by traversal of the cutting tool thus is provided with longitudinal halves which are rotationally symmetrical, to render the anvil reversible.

It will be apparent that traversal of the working face 22 by the cutting tool 44 may be achieved by longitudinal reciprocation of the block 34 relative to a fixed cutting tool, as previously explained, or by longitudinal reciprocation of the cutting tool 44, in the direction of the arrow 38, relative to a fixed block.

The previously described method also may be accomplished by the form of apparatus illustrated in FIG. 9. In this embodiment a pivot shaft 52 is mounted on a suitable frame 54 for pivotal oscillation on the same axis as the rotary shaft 10, with respect to the plane of the anvil 20, whereby to provide the same acute included angle $a$ (FIG. 2). A pair of longitudinally spaced radial arms 56 extend from the shaft 52 and support the rotary shaft 58 which mounts a cutting tool 60 of uniform diameter. The shaft 58 is connected through an appropriate gear reduction unit 62 to an electric drive motor 64, and its axis of rotation is parallel to the axis of the pivot shaft 52, whereby to preserve said acute included angle. Means (not shown) is provided for maintaining the distance between the rotational axis of the shaft 52 and the cutting surface of the tool 60 the same distance as the radius R of rotation of the cutter blades 16.

Thus, with the cutting tool 60 and anvil 20 disposed in the relative positions just described and with the cutting tool being rotated by the motor 64, the shaft 52 is oscillated to move the cutting surface of the tool transversely across the working face 22 of the anvil. The working face thus produced has the same longitudinally arcuate and transversely sinusoidal contour as produced by the apparatus illustrated in FIG. 4.

From the foregoing it will be appreciated that the present invention provides a rotary cutting device in which a straight flat cutter blade and a flat anvil may be disposed at a substantial acute shearing angle. The cutter blades thus may be sharpened expeditiously with conventional equipment and may be replaced at minimum cost. The rotary cutting device of this invention is usable for cutting metal and other materials, and has particular utility in a reduction of scrap wood veneer to chips suitable for pulping. Apparatus provided for forming the working edge of the anvil also may be utilized to resharpen said working edges. Moreover, the working face of the anvil may provide a pair of working edges which are usable by reversing the anvil.

It will be apparent those skilled in the art that various changes in the size, shape, number and arrangement of parts described hereinbefore may be made without departing from the spirit of this invention.

Having now described my invention and the manner in which it may be used,

I claim:
1. A rotary cutting device, comprising
   a. an elongated head member mounted for axial rotation,
   b. an elongated, straight cutter blade mounted on the head member parallel to its axis of rotation, whereby to describe a cylinder of uniform diameter during rotation of the blade, and
   c. an elongated, one-piece, flat anvil member mounted adjacent the head member and providing a flat work-supporting surface forming with the blade an acute included angle,
   d. the anvil member having a longitudinally concave working edge which is contiguous to said defined cylinder uniformly throughout its length.
2. The rotary cutting device of claim 1 wherein the working face of the anvil member is transversely sinusoidal, defining a pair of spaced, longitudinally concave working edges which are reverse images of each other, whereby the anvil member is reversible.

* * * * *